United States Patent
Huang et al.

(10) Patent No.: US 7,461,535 B2
(45) Date of Patent: Dec. 9, 2008

(54) MULTI-TEMPERATURE PROGRAMMING FOR ACCELEROMETER

(75) Inventors: Feiming Huang, Wuxi (CN); Haidong Liu, Wuxi (CN)

(73) Assignee: MEMSIC, Inc., N. Andover, MA (US)

( * ) Notice: Subject to any disclaimer, the term of this patent is extended or adjusted under 35 U.S.C. 154(b) by 401 days.

(21) Appl. No.: 11/365,574

(22) Filed: Mar. 1, 2006

(65) Prior Publication Data

US 2007/0204672 A1    Sep. 6, 2007

(51) Int. Cl.
*G01P 21/00*    (2006.01)
*G01D 3/028*    (2006.01)

(52) U.S. Cl. .................. 73/1.01; 73/1.38; 702/116; 374/2

(58) Field of Classification Search .......... 73/1.01, 73/1.38, 497; 374/1–2, E1.023; 702/116, 702/FOR. 158
See application file for complete search history.

(56) References Cited

U.S. PATENT DOCUMENTS

| | | | |
|---|---|---|---|
| 5,902,925 A | 5/1999 | Crispie et al. | 73/1.88 |
| 6,795,752 B1 | 9/2004 | Zhao et al. | 700/299 |
| 6,867,611 B2 | 3/2005 | Stone | 324/760 |
| 6,905,333 B2 | 6/2005 | Cox | 432/253 |
| 6,941,809 B2 * | 9/2005 | Le Roy et al. | 73/497 |

* cited by examiner

*Primary Examiner*—Thomas P Noland
(74) *Attorney, Agent, or Firm*—Weingarten, Schurgin, Gagnebin & Lebovici LLP

(57) ABSTRACT

A system and method for testing and calibrating integrated sensor devices that improves the manufacturing test throughput of the devices. The system includes a tester, a temperature controller, and at least one probe station including a thermal chuck. The chuck can be heated to specified temperatures to achieve variable heating of a wafer, PCB, or pallet disposed thereon. The temperature controller adjusts the temperature of the chuck to a first specified level. The tester performs at least one first measurement of the output offset of each integrated sensor embodied as a die on the wafer, or as a device on the PCB or pallet. Next, the temperature controller adjusts the temperature of the chuck to a second specified level, and the tester performs at least one second measurement of the output offset of each integrated sensor at the second temperature level. The offset temperature coefficient (OTC) of each sensor is calculated based upon the output offset measurements performed at the first and second temperature levels, and optimal settings for calibrating the respective sensors are determined based upon the calculated OTC values. After the temperature of the chuck is brought back down to the first specified level, the tester programs the output offset calibration settings into each sensor.

9 Claims, 8 Drawing Sheets

MULTI-TEMPERATURE PROGRAMMING FOR ACCELEROMETER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to accelerometers, and more specifically to techniques for improving the manufacturing test and calibration throughput of integrated convective accelerometers.

U.S. Pat. No. 6,795,752 entitled THERMAL CONVECTION ACCELEROMETER WITH CLOSED-LOOP HEATER CONTROL issued Sep. 21, 2004 and assigned to the same assignee of the present invention (the "'752 patent") discloses an integrated convective accelerometer comprising a convective acceleration sensor that includes a pair of temperature sensing elements disposed on opposing sides of a heater element. When an acceleration is applied to the integrated convective accelerometer along a sense axis passing through the heater element and the pair of temperature sensing elements within the convective acceleration sensor, the sensor produces a differential output voltage proportional to the magnitude of the applied acceleration. In recent years, accelerometers like the integrated convective accelerometer disclosed in the '752 patent have been increasingly employed in high accuracy applications for sensing acceleration in a variety of environments, including environments in which temperatures can vary over a broad range. However, the outputs produced by such accelerometers can vary over temperature, thereby reducing the overall accuracy of the accelerometers.

For this reason, compensation and calibration circuitry have been employed in conjunction with accelerometers to compensate for temperature fluctuations occurring within the local environment of the accelerometer device, and to calibrate the accelerometer output gain and offset. Such compensation and calibration circuitry may be included in the accelerometer itself, or may be implemented external to the accelerometer device. For example, the integrated convective accelerometer disclosed in the '752 patent includes temperature compensation circuitry that allows the sensitivity of the convective acceleration sensor to be maintained at a desired level as the temperature of the local environment changes. Specifically, the integrated convective accelerometer includes amplification circuitry operative to extract an average output voltage from the differential output voltage produced by the convective acceleration sensor. The average output voltage provides a measure of the temperature gradient produced by the heater element within the convective acceleration sensor. The integrated convective accelerometer further includes control circuitry operative to produce a control output for regulating the average output voltage, thereby regulating the temperature gradient of the heater element. In this way, the sensitivity of the convective acceleration sensor can be maintained at the desired level over temperature.

In addition, the integrated convective accelerometer disclosed in the '752 patent includes calibration adjustment circuitry for setting the common-mode voltage drop across the temperature sensing elements within the convective acceleration sensor, and for setting the accelerometer output gain and offset. The integrated convective accelerometer is typically calibrated by adjusting one or more parameters including the offset temperature coefficient (OTC) of the accelerometer device. Specifically, in a typical calibration routine, the integrated convective accelerometer is brought to an initial temperature, e.g., $25°±2°$ C., and, in the absence of an applied acceleration, the output offset of the convective acceleration sensor is measured. In one calibration mode, the output offset of the convective acceleration sensor is measured for a number of settings of the common-mode voltage drop across the temperature sensing elements. Next, the accelerometer device is brought to a second higher temperature, e.g., $85°±20°$ C., and the output offset of the convective acceleration sensor is measured again in the absence of an applied acceleration for the same settings of the common-mode voltage drop across the temperature sensing elements. The OTC of the accelerometer device is then calculated using the output offset measurements performed at the two temperatures of the device, and an optimal setting for calibrating the accelerometer output offset is determined based upon the calculated OTC. Finally, the integrated convective accelerometer is brought back to its initial temperature, and the output offset calibration setting is programmed into the device, for example, by setting one or more internal fuses.

One drawback of the above-described technique for calibrating the output offset of an integrated convective accelerometer is that the time required for performing the calibration routine can be excessively long. For example, as described above, the integrated convective accelerometer of the '752 patent is typically calibrated by taking a number of measurements of the output offset of the convective acceleration sensor at an initial temperature, and then taking a number of additional measurements of the output offset at a higher second temperature of the accelerometer device. However, each of these output offset measurements can take on the order of 0.1 second to perform, thereby significantly reducing the manufacturing test throughput of the devices. The manufacturing test throughput of the convective accelerometer devices is further reduced if the devices are calibrated in a serial fashion.

It would therefore be desirable to have an improved technique for testing and calibrating integrated sensor devices such as integrated convective accelerometers. Such a test and calibration technique would improve the overall manufacturing test and calibration throughput of the sensor devices. It would also be desirable to have an improved manufacturing test technique that can be employed for calibrating integrated sensor devices having one or more device parameters that are temperature dependent.

BRIEF SUMMARY OF THE INVENTION

In accordance with the present invention, a system and method of testing and calibrating integrated sensors in a manufacturing environment is provided that improves the manufacturing test throughput of the sensors. The presently disclosed system and method provides such improved manufacturing test throughput by allowing a plurality of integrated sensors to be tested in parallel, for example, at at least one probe station. In the event the integrated sensors under test have one or more parameters that are temperature dependent, the sensors may be tested at a first temperature using a first probe station, and may subsequently be tested at a second higher temperature using a second probe station. The integrated sensors under test may alternatively be tested at multiple temperatures at a single probe station using a variable temperature chuck. The presently disclosed system and method may also employ multiple oven chambers during the testing of integrated sensors to improve the overall manufacturing test throughput of the sensors. The presently disclosed system and method may be employed to improve the manufacturing test and calibration throughput of integrated sensors such as integrated convective accelerometers.

In one embodiment, a system for testing and calibrating a plurality of integrated sensors comprises a tester, a temperature controller, and at least one probe station including at least one support structure referred to herein as a chuck. The chuck is configured to support the plurality of integrated sensors during testing and/or calibration of the sensors. In one embodiment, the chuck is configured to support at least one semiconductor wafer having a plurality of dies formed thereon. In this embodiment, each of the integrated sensors is embodied as a respective die on the wafer. In another embodiment, the chuck is configured to support at least one printed circuit board (PCB) or pallet. In this alternative embodiment, each of the integrated sensors is embodied as a device disposed on the PCB or pallet. In the presently disclosed system, the chuck is a thermal chuck that can be heated to specified temperatures to achieve variable heating of a wafer, a PCB, or a pallet disposed thereon. For example, the temperature controller may be configured to adjust the temperature of the thermal chuck to specified levels by controlling the circulation of a heated fluid through the chuck, by controlling electric resistance heating of the chuck, or by controlling the temperature of the chuck using any other suitable technique. The probe station may also include at least one process chamber in which the chuck may be disposed. In addition, the temperature controller may be configured to adjust the temperature within the process chamber to specified levels.

In a first mode of operation, a plurality of integrated sensors is embodied as a plurality of dies on a semiconductor wafer, which is disposed on the thermal chuck. Next, the temperature controller adjusts the temperature of the thermal chuck to a first specified level, thereby bringing the temperature of the wafer approximately to the first specified level. The tester then performs at least one first measurement of the output offset of each of the integrated sensors disposed on the wafer at the first specified temperature level. Next, the temperature controller adjusts the temperature of the thermal chuck to a second specified level, thereby bringing the temperature of the wafer approximately to the second specified level, in which the second specified temperature level is higher than the first specified temperature level. The tester then performs at least one second measurement of the output offset of each of the integrated sensors disposed on the wafer at the second specified temperature level. Next, the offset temperature coefficient (OTC) of each integrated sensor is calculated based upon the output offset measurements performed at the first and second temperature levels. Optimal settings for calibrating the respective integrated sensors are then determined based upon the calculated OTC values. Next, the temperature controller adjusts the temperature of the thermal chuck to the first specified temperature level, thereby bringing the temperature of the wafer back down approximately to the first specified level. In one mode of operation, the plurality of integrated sensors can be programmed to maintain the output offset calibration settings determined by the above-described calibration routine. In this mode of operation, while the wafer is at the first specified temperature level, the tester programs the output offset calibration settings into each sensor, for example, by setting one or more internal fuses, or by any other suitable programming technique.

In a second embodiment, a system for testing and calibrating a plurality of integrated sensors such as integrated convective accelerometers comprises a tester, first and second probe stations, and a conveyor. Each of the first and second probe stations includes an oven chamber, at least one support structure such as a chuck disposed within the oven chamber, and a motor and crankshaft. Each support structure is configured to support a plurality of integrated convective accelerometers during testing and/or calibration of the devices. In one embodiment, each support structure is configured to fixedly support at least one semiconductor wafer, printed circuit board (PCB), or pallet having the integrated convective accelerometers disposed thereon. The motor and crankshaft are configured to selectively rotate the support structure having the wafer, PCB, or pallet fixedly attached thereto in a clockwise or counterclockwise fashion, thereby applying a predetermined acceleration along a sense axis of the respective accelerometers. The conveyor is configured to transfer the wafer, PCB, or pallet between the respective oven chambers included in the first and second probe stations.

In a second mode of operation, a PCB or pallet having a plurality of integrated convective accelerometers disposed thereon is fixedly attached to the support structure within a first oven chamber of a first probe station. Next, the temperature within the first oven chamber is brought to a first specified level, thereby bringing the temperature of the convective accelerometer devices disposed on the PCB or pallet approximately to the first specified level. The tester then performs at least one first measurement of the output offset of each of the convective acceleration sensors at the first specified temperature level. In addition, the tester performs at least one first measurement of the output of each of the convective acceleration sensors at a minimum level and a maximum level of acceleration applied to the accelerometer devices via the motor and crankshaft included in the first probe station, while the accelerometer devices are at the first specified temperature level. Next, the plurality of integrated convective accelerometers disposed on the PCB or pallet are transferred from the first oven chamber of the first probe station to a second oven chamber of a second probe station, and the PCB or pallet is fixedly attached to the support structure within the second oven chamber. The temperature within the second oven chamber is then brought to a second specified level higher than the first specified temperature level, thereby bringing the temperature of the convective accelerometer devices disposed on the PCB or pallet approximately to the second specified level. The tester then performs at least one second measurement of the output offset of each of the convective acceleration sensors at the second specified temperature level. In addition, the tester performs at least one second measurement of the output of each of the convective acceleration sensors at the minimum level and the maximum level of acceleration applied to the accelerometer devices via the motor and crankshaft included in the second probe station, while the accelerometer devices are at the second specified temperature level. Next, the offset temperature coefficient (OTC) of each convective acceleration sensor is calculated based upon the output offset measurements performed at the first and second temperature levels. Optimal settings for calibrating the output offset of the respective convective acceleration sensors are then determined based upon the calculated OTC values. In addition, the sensitivity of each convective acceleration sensor is calculated based upon the sensor output measurements performed at the first and second temperature levels and at the minimum and maximum acceleration levels. Optimal settings for calibrating the sensitivity of the respective convective acceleration sensors are then determined based upon the calculated sensitivity values. Next, the temperature within the second oven chamber is brought back down to the first specified level, thereby bringing the temperature of the convective accelerometer devices disposed on the PCB or pallet approximately to the first specified level. While the convective accelerometer devices are at the first specified temperature level, the tester programs the output offset and sensitivity calibration settings into the accelerometer devices, for example, by setting one or more internal fuses, or by any other suitable programming technique.

By testing and calibrating a plurality of integrated sensor devices such as integrated convective accelerometers in parallel at one or more probe stations using a thermal chuck or one or more oven chambers, the manufacturing test and calibration throughput of the devices can be significantly improved over conventional techniques.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A system and method of testing and calibrating integrated sensor devices such as integrated convective accelerometers is disclosed that improves the manufacturing test throughput of the sensor devices. The presently disclosed system allows a plurality of integrated sensor devices to be tested in parallel at one or more probe stations. In the event the integrated sensor devices under test have one or more device parameters that are temperature dependent, multiple sensor devices may be tested at a first temperature using a first probe station, and may subsequently be tested at a second higher temperature using a second probe station. Alternatively, such integrated sensor devices may be tested at multiple temperatures at a single probe station using a variable temperature chuck. The presently disclosed system and method may also employ multiple oven chambers during the testing of integrated sensor devices to improve the overall manufacturing test throughput of the devices. The presently disclosed system and method may be employed to improve the manufacturing test and calibration throughput of integrated sensor devices such as integrated convective accelerometers.

Figure 1:
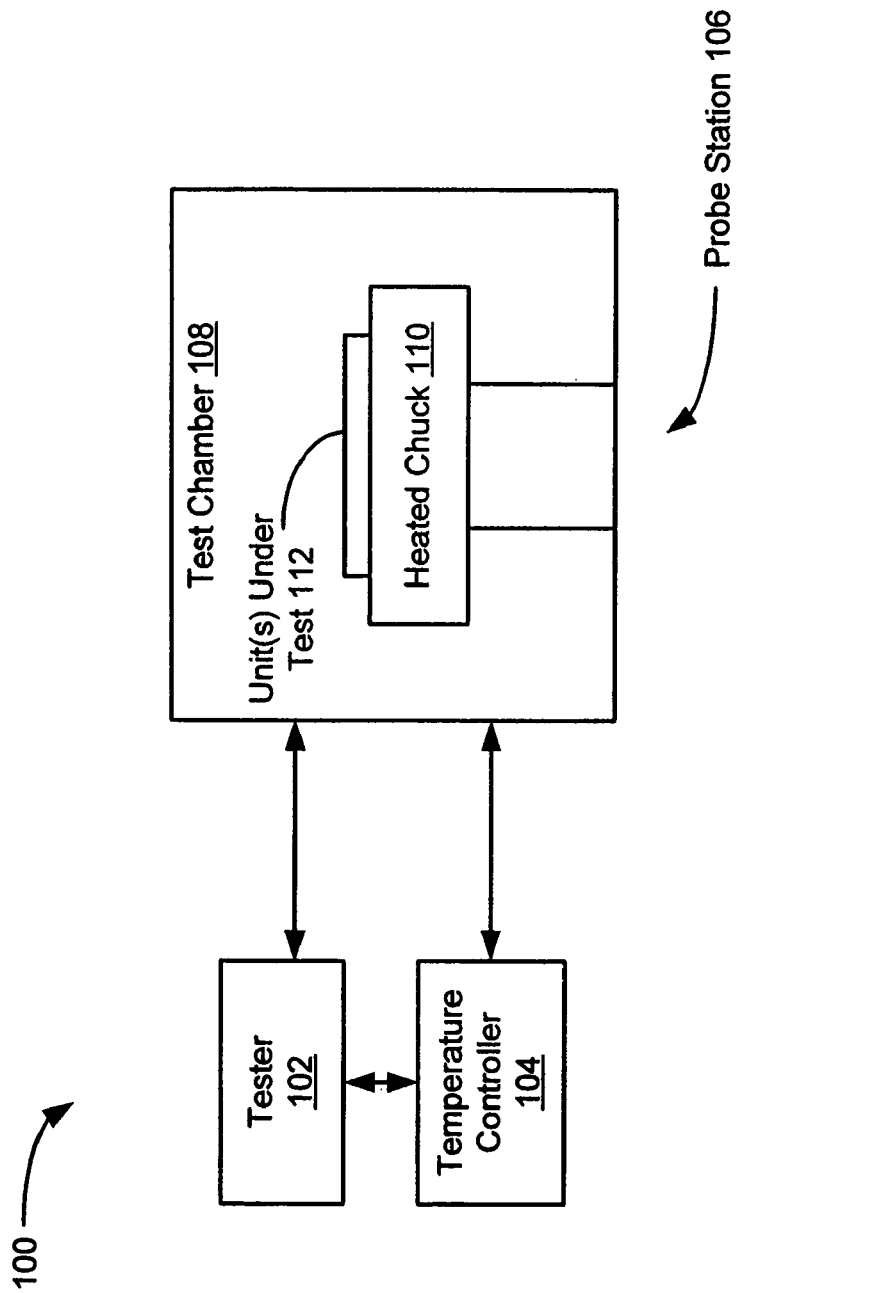
FIG. 1 is a block diagram of a first system including a probe station for testing and calibrating integrated sensors according to the present invention.

FIG. 1 depicts an illustrative embodiment of a first system 100 for testing and calibrating a plurality of integrated sensors, in accordance with the present invention. In the illustrated embodiment, the first test system 100 comprises a tester 102, a temperature controller 104, and a probe station 106, which includes a test chamber 108, and a support structure 110 referred to herein as a chuck. As shown in FIG. 1, the chuck 110 is configured to support a plurality of units under test (UUTs) 112 such as a plurality of integrated sensors. For example, the test system 100 may be employed for testing and calibrating a plurality of integrated convective accelerometers, the structure and functionality of which are described in U.S. Pat. No. 6,795,752 entitled THERMAL CONVECTION ACCELEROMETER WITH CLOSED-LOOP HEATER CONTROL issued Sep. 21, 2004 and assigned to the same assignee of the present invention (the "'752 patent"), the entire disclosure of which is incorporated herein by reference. It is appreciated, however, that the test system 100 may alternatively be employed for testing and/or calibrating any other suitable type of sensor or electronic circuit.

For example, the test system 100 of FIG. 1 may be employed for testing and calibrating integrated sensor devices having one or more device parameters that are temperature dependent, such as the integrated convective accelerometer described in the '752 patent. To that end, the probe station 106 includes the chuck 110, which in the presently disclosed embodiment is a thermal chuck capable of being heated to a range of specified temperatures, for example, from about 25° C. to about 150° C. In the presently disclosed embodiment, the temperature controller 104 is operative to control the temperature of the chuck 110, which in turn controls the temperature of the UUTs 112 disposed on the heated chuck 110.

In one embodiment, the temperature controller 104 is operative to control the temperature of the chuck 110 at least to within ±2° C. For example, the temperature controller 104 may be configured and arranged to adjust the temperature of the thermal chuck 110 to specified levels by controlling the circulation of a heated fluid through the chuck 110, by controlling electric resistance heating of the chuck 110, or by controlling the temperature of the chuck 110 using any other suitable technique. In addition, the plurality of UUTs 112 may be embodied as a plurality of dies formed on a semiconductor wafer, or a plurality of devices disposed on a printed circuit board (PCB) or a pallet. Such a wafer, PCB, or pallet may be disposed on a surface of the thermal chuck 110 in direct physical contact with the chuck 110, and may be fixedly attached to the chuck surface by one or more pins or any other suitable attachments or fasteners. In an alternative embodiment, the wafer, PCB, or pallet may be supported on the thermal chuck 110 by a plurality of pins such that the wafer, PCB, or pallet is disposed slightly above the surface of the thermal chuck 110. It should be understood that such thermal chucks are known in the art, and are therefore of known construction. The specific implementation of the thermal chuck 110 included in the test system 100 of FIG. 1 is not critical to the invention.

In the presently disclosed embodiment, the thermal chuck 110 having the plurality of UUTs 112 disposed thereon is contained within the test chamber 108 of the probe station 106. In one embodiment, the temperature controller 104 may be operative to control the temperature of the chuck 110 itself and/or the temperature of the air within the test chamber 108. For example, the temperature controller 104 may be configured and arranged to adjust the temperature within the test chamber 108 to specified levels by controlling the temperature of a stream of air injected into the test chamber 108 by an air source (not shown), or by controlling the air temperature within the chamber 108 using any other suitable technique. By controlling the temperature of the thermal chuck 110 and/or the temperature of the air within the test chamber 108 via the temperature controller 104, controlled variable heating of a wafer, a PCB, or a pallet disposed on the chuck 110 can be achieved.

As described above, the test system 100 of FIG. 1 comprises the probe station 106, which in the presently disclosed embodiment includes a prober configured to test the plurality of UUTs 112 embodied as a plurality of dies on a wafer or a plurality of packaged integrated circuit devices (ICs) on a PCB or pallet over temperature. In one embodiment, the prober is configured to obtain the status of each of the dies or ICs under test, and to store the test status information, for example, in the tester memory. In the event the plurality of UUTs 112 is embodied as a plurality of dies on a wafer, the prober may be a wafer prober configured to store the test status information and to detect the presence/absence of the wafer using a wafer mapping function.

Figure 2A:
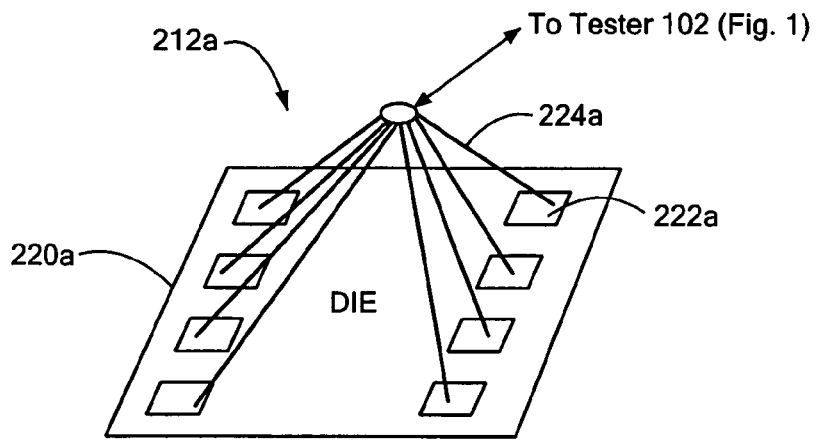
FIG. 2a is a perspective view of an integrated sensor embodied as a die that may be tested using a semiconductor wafer prober included in the system of FIG. 1.

FIG. 2a depicts a representation 212a of one of the plurality of UUTs 112 (see FIG. 1) embodied as a die 220a on a wafer. As shown in FIG. 2a, the die 220a includes a plurality of pads such as a pad 222a, which may be connected to one or more inputs or an output of an electronic circuit on the die 220a implementing the UUT. As described above, the probe station 106 may include a wafer prober configured to test a plurality of UUTs embodied as a plurality of dies on a wafer. To that end, the wafer prober includes a plurality of probe pins such as a probe pin 224a contacting the pad 222a. The wafer prober is configured to provide test input signals to the UUT, and to receive test output signals from the UUT, via the probe pins under the control of the tester 102 (see FIG. 1).

Figure 2B:
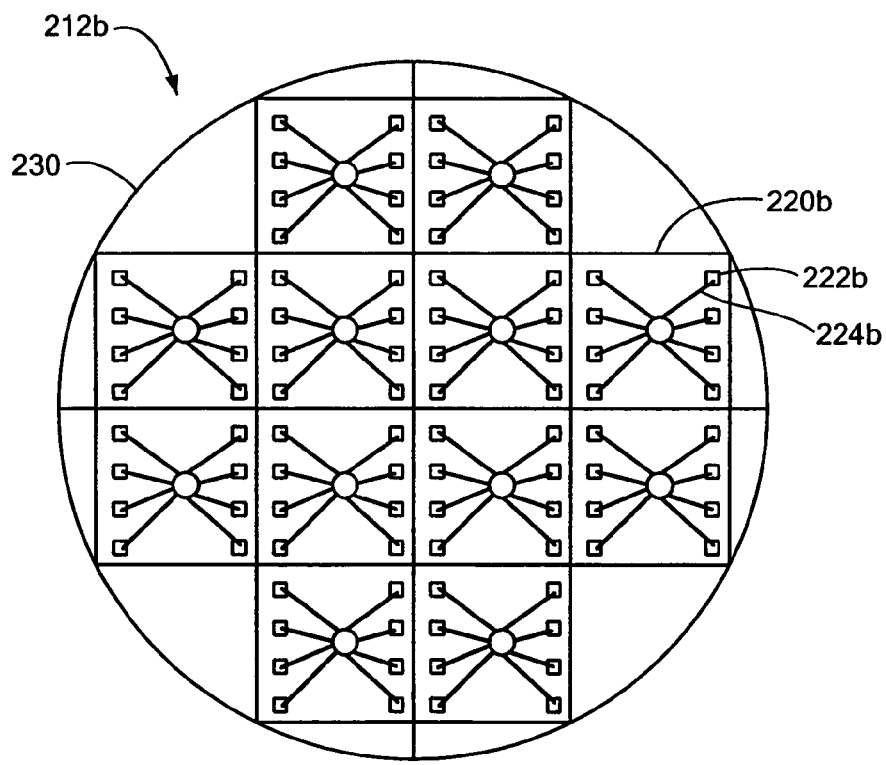
FIG. 2b is a plan view of a plurality of integrated sensors embodied as a plurality of dies on a semiconductor wafer, which may be tested using the wafer prober included in the system of FIG. 1.

FIG. 2b depicts a representation 212b of a semiconductor wafer 230 having a plurality of dies formed thereon such as a die 220b. As indicated above, the plurality of UUTs 112 (see FIG. 1) may be embodied as the plurality of dies, including the die 220b on the wafer 230. Like the die 220a (see FIG. 2a), each of the plurality of dies on the wafer 230 includes a plurality of pads, for example, the die 220b includes a pad 222b. Further, the plurality of probe pins included in the wafer prober may be employed to contact the plurality of pads corresponding to each die. For example, a probe pin 224b may be employed to contact the pad 222b corresponding to the die 220b. The wafer prober is configured to provide test input signals to the plurality of UUTs, and to receive test output signals from the UUTs, via the probe pins under the control of the tester 102 (see FIG. 1). By disposing the wafer 230 on the heated chuck 110 included in the probe station 106, the test system 100 may be employed to test the plurality of UUTs embodied as the plurality of dies at the wafer level.

Figure 2C:
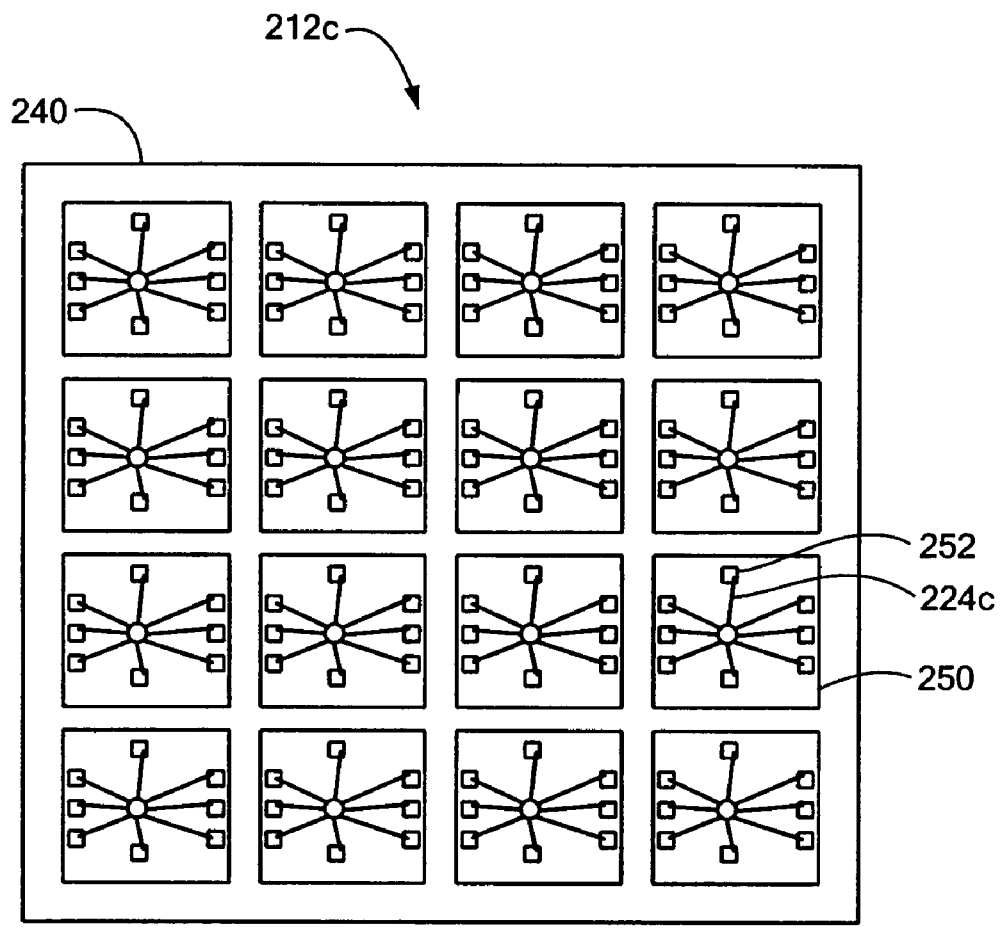
FIG. 2c is a plan view of a printed circuit board (PCB) or pallet carrying a plurality of integrated sensors embodied as a plurality of integrated sensor devices, which may be tested using a prober included in the system of FIG. 1.

FIG. 2c depicts a representation 212c of a printed circuit board (PCB) or pallet 240 having a plurality of integrated circuit devices (ICs) disposed thereon such as an IC device 250. As indicated above, the plurality of UUTs 112 (see FIG. 1) may be embodied as the plurality of IC devices, including the IC device 250 on the PCB or pallet 240. Each of the plurality of IC devices on the PCB or pallet 240 includes a plurality of pads, for example, the IC device 250 includes a pad 252. Further, the plurality of probe pins included in the prober may be employed to contact the plurality of pads corresponding to each IC device. For example, a probe pin 224c may be employed to contact the pad 252 corresponding to the IC device 250. The prober is configured to provide test input signals to the plurality of UUTs, and to receive test output signals from the UUTs, via the probe pins under the control of the tester 102 (see FIG. 1). By disposing the PCB or pallet 240 on the heated chuck 110 included in the probe station 106, the test system 100 may be employed to test the plurality of UUTs embodied as the plurality of IC devices at the PCB or pallet level.

Figure 3:
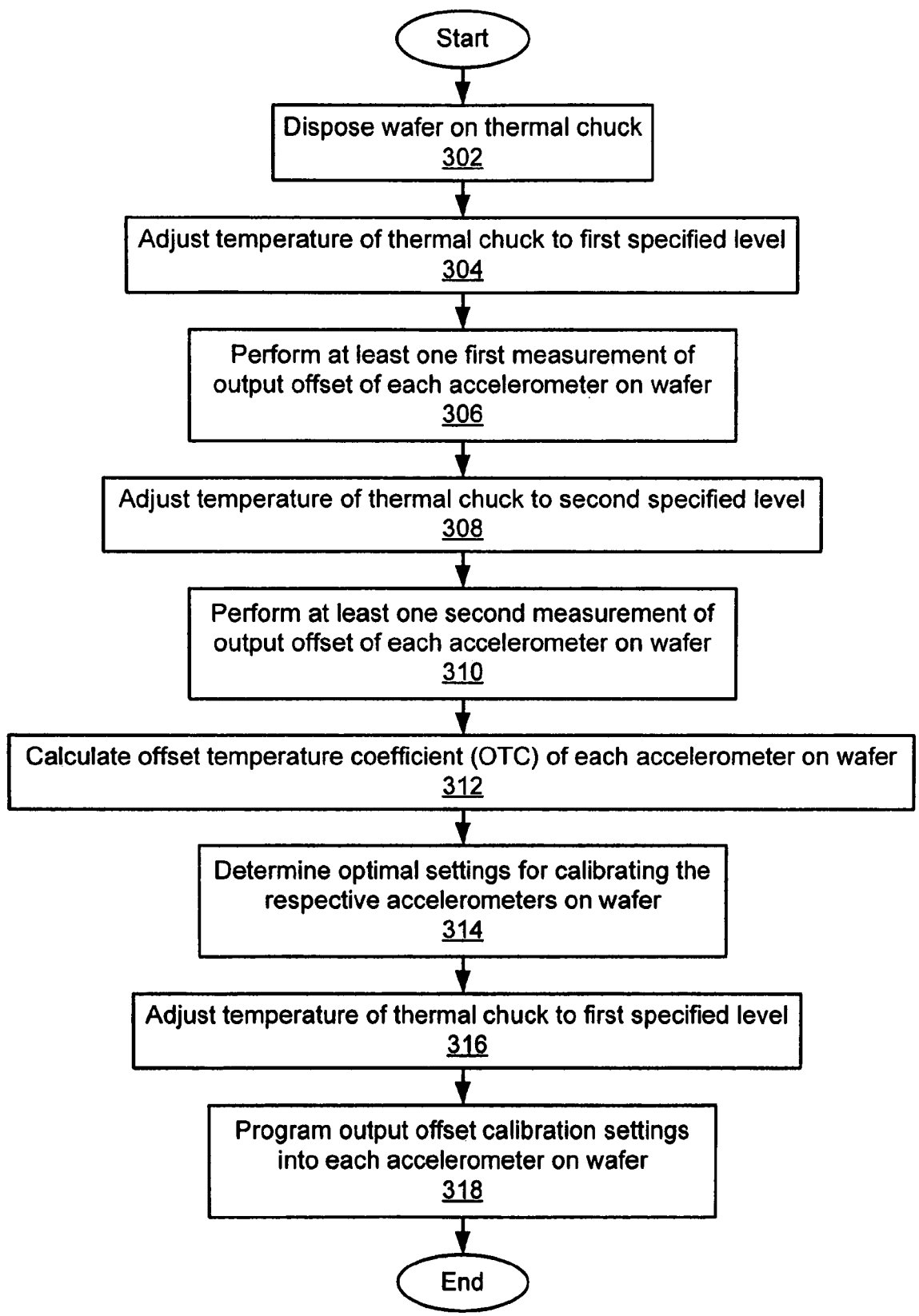
FIG. 3 is a flow diagram of a method of operating the system of FIG. 1.

An illustrative method of testing and calibrating a plurality of units under test (UUTs) using the test system 100 is described below with reference to FIGS. 1 and 3. In this illustrative method, the plurality of UUTs is embodied as a plurality of dies on a wafer, and therefore the test and calibration of the respective UUTs is performed at the wafer level. Further, each of the plurality of dies corresponds to an integrated convective accelerometer, as described in the '752 patent. As depicted in step 302, the wafer carrying the plurality of dies is disposed on the thermal chuck 110. Next, the temperature controller 104 adjusts the temperature of the thermal chuck 110 to a first specified level, e.g., 25° C., as depicted in step 304, thereby bringing the temperature of the wafer approximately to the first specified level. The tester 102 then performs, in the absence of an applied acceleration, at least one first measurement of the output offset of each of the integrated convective accelerometers disposed on the wafer at the first specified temperature level, as depicted in step 306. Next, the temperature controller 104 adjusts the temperature of the thermal chuck 110 to a second specified level, e.g., 85° C., as depicted in step 308, thereby bringing the temperature of the wafer approximately to the second specified level. In this illustrative method, the second specified temperature level is higher than the first specified temperature level. The tester 102 then performs, in the absence of an applied acceleration, at least one second measurement of the output offset of each of the integrated convective accelerometers disposed on the wafer at the second specified temperature level, as depicted in step 310. Next, the offset temperature coefficient (OTC) of each integrated convective accelerometer is calculated, as depicted in step 312, based upon the output offset measurements performed at the first and second temperature levels. Optimal settings for calibrating the respective integrated convective accelerometers are then determined based upon the calculated OTC values, as depicted in step 314. Next, the temperature controller 104 adjusts the temperature of the thermal chuck 110 to the first specified temperature level, as depicted in step 316, thereby bringing the temperature of the wafer back down approximately to the first specified level. While the wafer is at the first specified temperature level, the tester 102 programs the output offset calibration settings into each integrated convective accelerometer, for example, by setting one or more internal fuses, or by any other suitable programming technique, as depicted in step 318.

Figure 4:
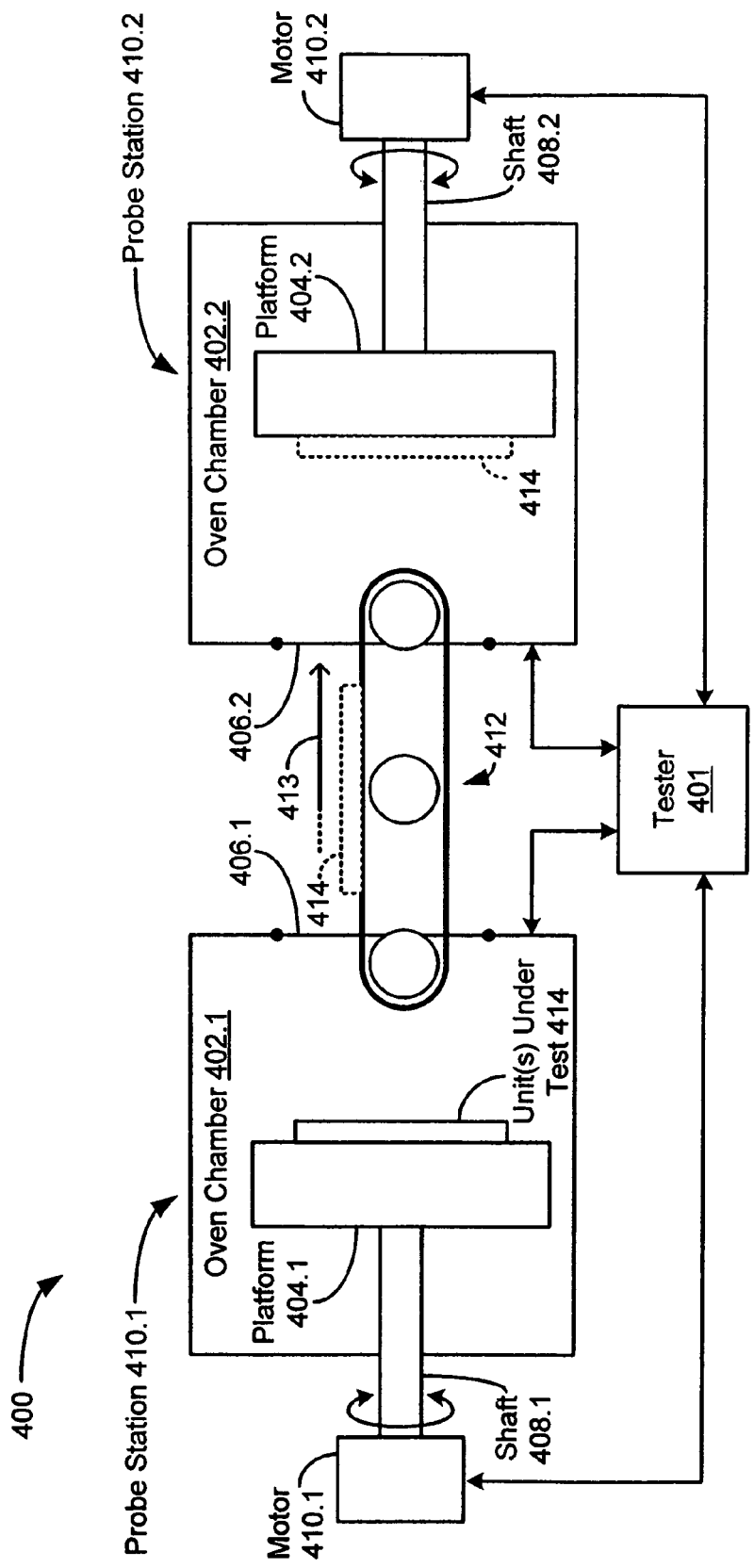
FIG. 4 is a block diagram of a second system including a plurality of probe stations for testing and calibrating integrated sensors according to the present invention.

FIG. 4 depicts an illustrative embodiment of a second system 400 for testing and calibrating a plurality of integrated sensors, in accordance with the present invention. In the illustrated embodiment, the second test system 400 comprises a tester 401, a plurality of probe stations 410.1-410.2, and a conveyor 412. The probe stations 410.1-410.2 include oven chambers 402.1-402.2, respectively, support platforms (e.g., chucks) 404.1-404.2, respectively, motors 410.1-410.2, respectively, and crankshafts 408.1-408.2, respectively. As shown in FIG. 4, each of the support platforms 404.1-404.2 is configured to support a plurality of units under test (UUTs) 414 such as a plurality of integrated sensors. For example, the test system 400 may be employed for testing and calibrating a plurality of integrated convective accelerometers such as the integrated convective accelerometer described in the '752 patent. It is appreciated, however, that the test system 400 may alternatively be employed for testing and/or calibrating any other suitable type of sensor or electronic circuit.

For example, the test system 400 of FIG. 4 may be employed for testing and calibrating integrated sensor devices having one or more device parameters that are temperature dependent. To that end, each of the oven chambers 402.1-402.2 may be set to a range of specified temperatures, for example, from about −40° C. to about 125° C., under the control of the tester 401. In one embodiment, the tester 401 is operative to control the temperature within the respective oven chambers 402.1-402.2 at least to within ±2° C. Further, each of the oven chambers 402.1-402.2 may include at least one temperature sensor operative to sense specified temperature levels and/or specified differences in temperature levels within the respective ovens, and to provide indications of the sensed temperatures to the tester 401. In this way, under the control of the tester 401, the temperature of the plurality of UUTs 414 can be brought to specified levels during test and calibration of the devices. In an alternative embodiment, each of the support platforms 404.1-404.2 may comprise a thermal chuck, and the test system 400 may be configured to adjust the temperature of the respective thermal chucks to provide further control of the temperature of the UUTs 414 disposed within the respective oven chambers.

It is understood that the plurality of UUTs 414 may be embodied as a plurality of dies formed on a semiconductor wafer, or a plurality of devices disposed on a printed circuit board (PCB) or a pallet. Such a wafer, PCB, or pallet may be disposed on a surface of the respective support platforms 404.1-404.2, or may be supported on the platforms 404.1-404.2 by a plurality of pins such that the wafer, PCB, or pallet is disposed at a slight distance from the surface of the respective platforms 404.1-404.2. In the presently disclosed embodiment, each of the support platforms 404.1-404.2 includes one or more pins or any other suitable attachments or fasteners for fixedly attaching the wafer, PCB, or pallet to the respective platforms 404.1-404.2 during test and calibration of the devices. In one embodiment, each of the support platforms 404.1-404.2 includes a reference inclinometer that can be controlled by the tester 401 to adjust and/or monitor the level of the respective platform. Each of the probe stations 410.1-410.2 comprises a prober including a plurality of probe pins for providing test input signals to the respective UUTs 414, and for receiving test output signals from the respective UUTs, under the control of the tester 401.

The motor 410.1 and crankshaft 408.1 included in the probe station 410.1, and the motor 410.2 and crankshaft 408.2 included in the probe station 410.2, are configured, under the control of the tester 401, to selectively rotate the respective support platforms 404.1-404.2 having the wafer, PCB, or pallet fixedly attached thereto in a clockwise or counterclockwise fashion in the plane of the respective platform, thereby applying a predetermined acceleration, e.g., 1-2 g, along a sense axis of the respective accelerometer devices. In the illustrated embodiment, the motors 410.1-410.2 are placed to the side of the oven chambers 402.1-402.2, respectively. Further, the support platforms 404.1-404.2 are situated within the oven chambers 402.1-402.2, respectively, to allow the motors 410.1-410.2 to rotate the platforms 404.1-404.2 while using gravity as an acceleration input, thereby facilitating the generation of the sensitivity signal over temperature. The conveyor 412 is configured to transfer the wafer, PCB, or pallet between the oven chambers 402.1-402.2 included in the probe stations 410.1-410.2, respectively. As shown in FIG. 4, the oven chambers 402.1-402.2 include ports 406.1-406.2, respectively, through which the wafer, PCB, or pallet can pass while being moved from one oven chamber to another via the conveyor 412. For example, the wafer, PCB, or pallet having the UUTs 414 disposed thereon may be moved from the oven chamber 402.1 to the oven chamber 402.2 by the conveyor 412 in the direction indicated by directional arrow 413.

In one embodiment, a first human operator may manually load a PCB or pallet with a plurality of integrated sensor devices to be tested, fixedly attach a wafer or the loaded PCB or pallet to the support platform within a first oven chamber, remove the wafer, PCB, or pallet from the support platform within the first oven chamber after testing is completed within the first chamber, and place the wafer, PCB, or pallet on the conveyor for transferring the wafer, PCB, or pallet from the first oven chamber to a second oven chamber. Next, the same first human operator or a different second human operator may fixedly attach the wafer, PCB, or pallet to the support platform within the second oven chamber, and remove the wafer, PCB, or pallet from the support platform within the second oven chamber after testing is completed within the second chamber. It should be appreciated that the test system 400 may be configured for automatically performing, under computer control, any or all of the activities performed by such human operators during the testing and calibration of integrated sensors or electronic circuits.

Figure 5A:
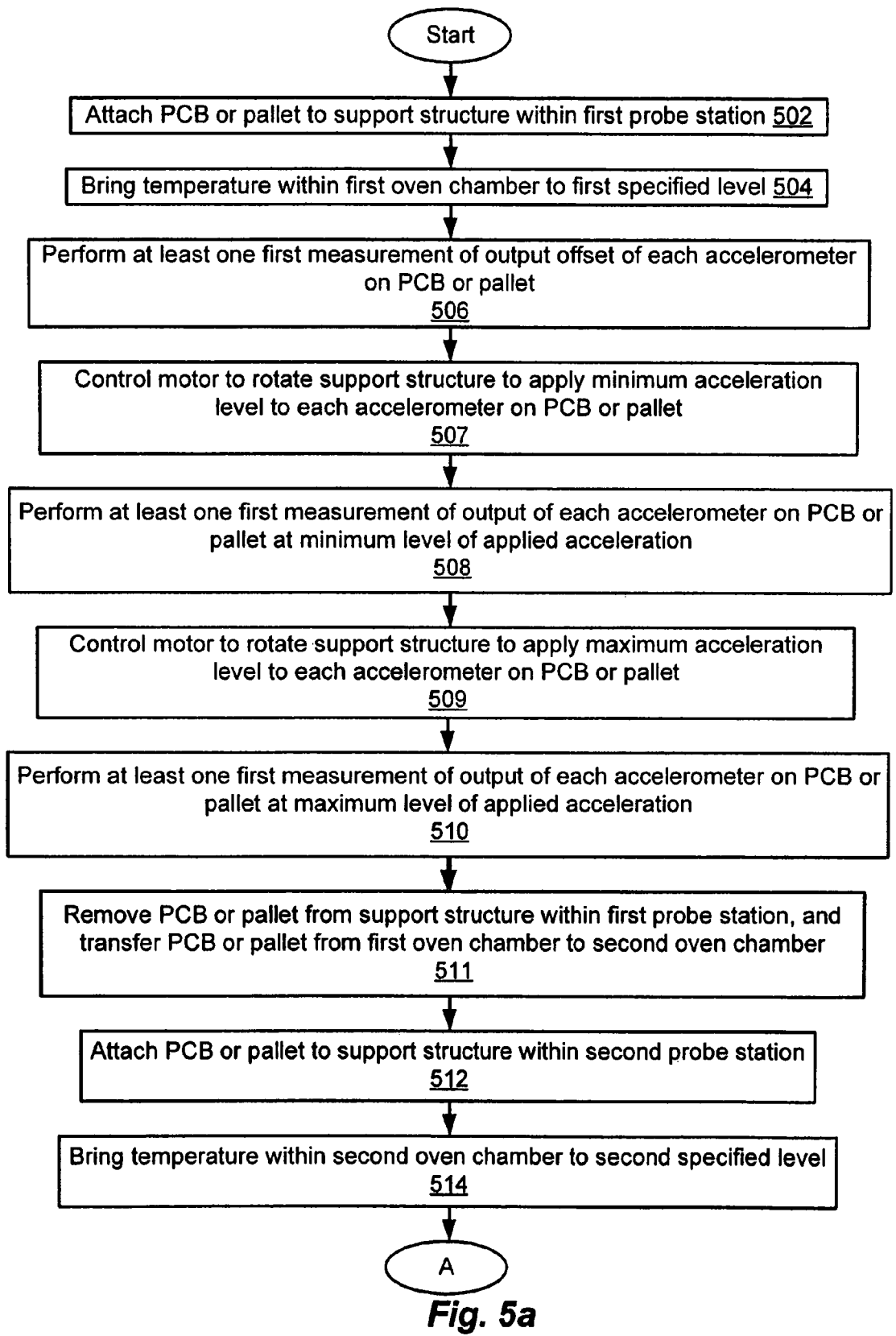
FIGS. 5a-5c are a flow diagram of a method of operating the system of FIG. 4.
Figure 5B:
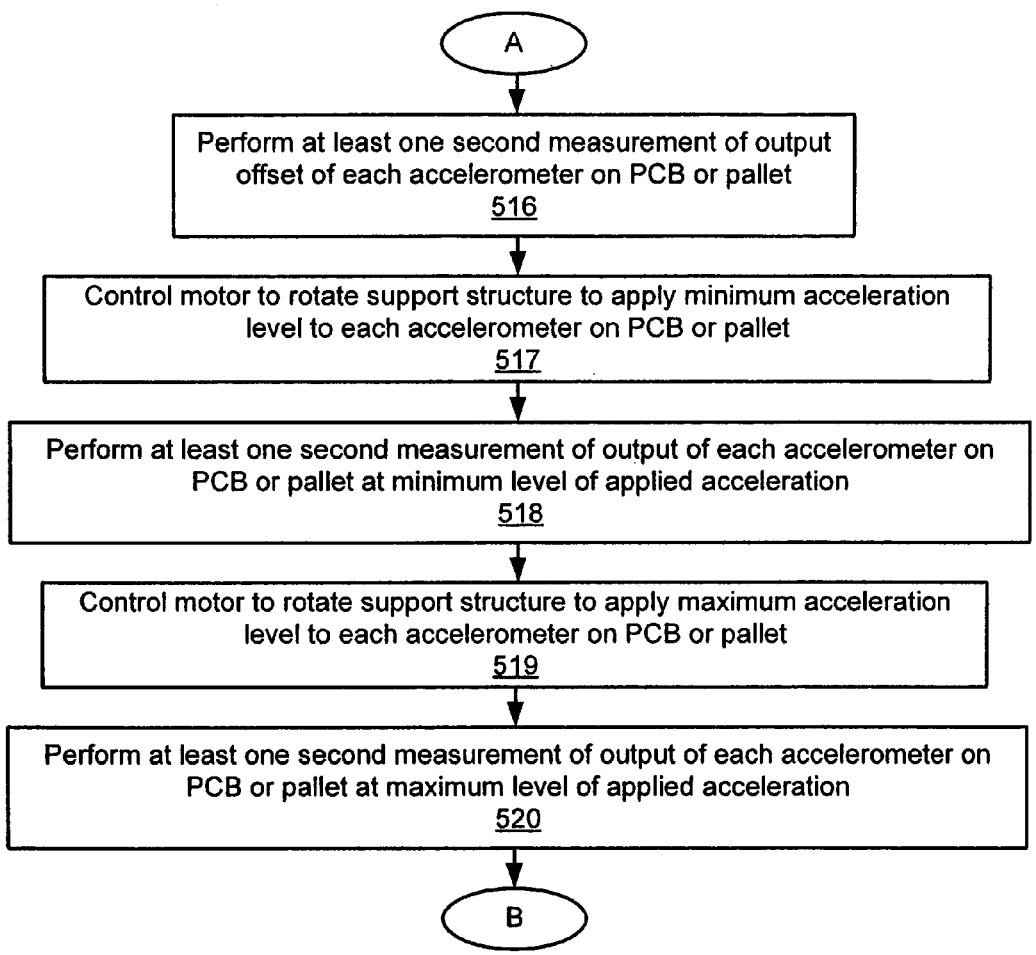
Figure 5C:
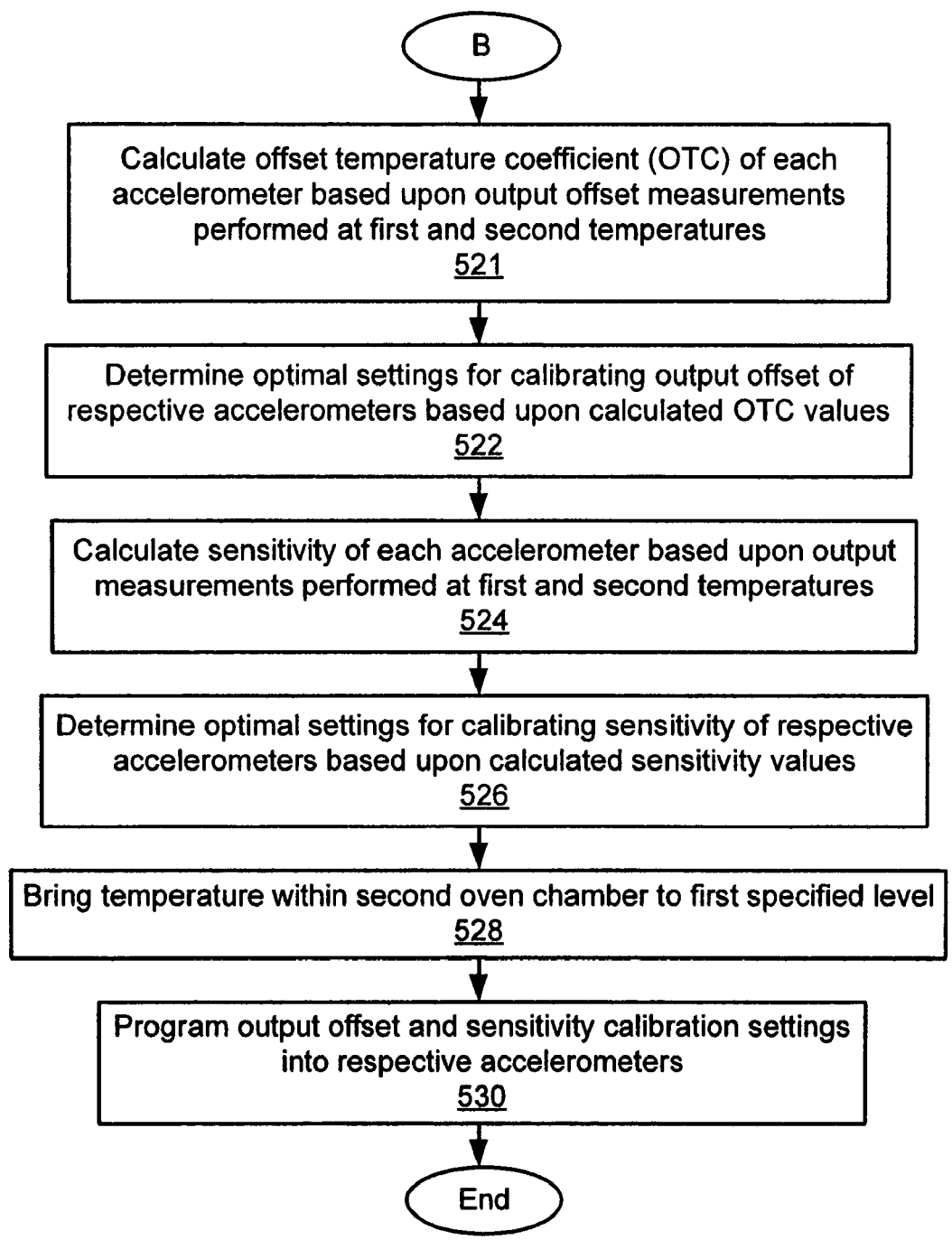

An illustrative method of testing and calibrating a plurality of units under test (UUTs) using the test system 400 is described below with reference to FIGS. 4 and 5a-5b. In this illustrative method, the plurality of UUTs is embodied as a plurality of devices on a printed circuit board (PCB) or pallet, and therefore the test and calibration of the respective UUTs is performed at the PCB or pallet level. Further, each of the plurality of devices corresponds to an integrated convective accelerometer, as described in the '752 patent. As depicted in step 502 (see FIG. 5a), a PCB or pallet having a plurality of integrated convective accelerometers disposed thereon is fixedly attached to the support structure within a first oven chamber of a first probe station. Next, the temperature within the first oven chamber is brought to a first specified level, e.g., −40° C., as depicted in step 504, thereby bringing the temperature of the convective accelerometer devices disposed on the PCB or pallet approximately to the first specified level. The tester then performs, in the absence of an applied acceleration, at least one first measurement of the output offset of each of the convective acceleration sensors at the first specified temperature level, as depicted in step 506. Next, the tester controls a motor associated with the first oven chamber to rotate the support structure within the first chamber in a clockwise or counterclockwise fashion, thereby applying a minimum level of acceleration to the accelerometer devices while the devices are at the first specified temperature level, as depicted in step 507. The tester then performs at least one first measurement of the output of each of the convective acceleration sensors at the minimum level of applied acceleration, as depicted in step 508. Next, the tester controls the motor associated with the first oven chamber to rotate the support structure within the first chamber in the same clockwise or counterclockwise fashion to apply a maximum level of acceleration to the accelerometer devices while the devices are at the first specified temperature level, as depicted in step 509. The tester then performs at least one first measurement of the output of each of the convective acceleration sensors at the maximum level of applied acceleration, as depicted in step 510. Next, the plurality of integrated convective accelerometers disposed on the PCB or pallet are removed from the support structure within the first oven chamber, and transferred from the first oven chamber to a second oven chamber of a second probe station by a conveyor, as depicted in step 511. The PCB or pallet is then fixedly attached to the support structure within the second oven chamber, as depicted in step 512. The temperature within the second oven chamber is then brought to a second specified level, e.g., 105° C., as depicted in step 514, thereby bringing the temperature of the convective accelerometer devices disposed on the PCB or pallet approximately to the second specified level. The tester then performs, in the absence of an applied acceleration, at least one second measurement of the output offset of each of the convective acceleration sensors at the second specified temperature level, as depicted in step 516 (see FIG. 5*b*). Next, the tester controls a motor associated with the second oven chamber to rotate the support structure within the second chamber in a clockwise or counterclockwise fashion, thereby applying the minimum level of acceleration to the accelerometer devices while the devices are at the second specified temperature level, as depicted in step 517. The tester then performs at least one second measurement of the output of each of the convective acceleration sensors at the minimum level of applied acceleration, as depicted in step 518. Next, the tester controls the motor associated with the second oven chamber to rotate the support structure within the second chamber in the same clockwise or counterclockwise fashion to apply the maximum level of acceleration to the accelerometer devices while the devices are at the second specified temperature level, as depicted in step 519. The tester then performs at least one second measurement of the output of each of the convective acceleration sensors at the maximum level of applied acceleration, as depicted in step 520. Next, the offset temperature coefficient (OTC) of each convective acceleration sensor is calculated, as depicted in step 521, based upon the output offset measurements performed at the first and second temperature levels. Optimal settings for calibrating the output offset of the respective convective acceleration sensors are then determined, as depicted in step 522, based upon the calculated OTC values. In addition, the sensitivity of each convective acceleration sensor is calculated, as depicted in step 524, based upon the sensor output measurements performed at the first and second temperature levels and at the minimum and maximum acceleration levels. Optimal settings for calibrating the sensitivity of the respective convective acceleration sensors are then determined, as depicted in step 526, based upon the calculated sensitivity values. Next, the temperature within the second oven chamber is brought back down to the first specified level, as depicted in step 528, thereby bringing the temperature of the convective accelerometer devices disposed on the PCB or pallet approximately to the first specified level. As depicted in step 530, while the convective accelerometer devices are at the first specified temperature level, the tester programs the output offset and sensitivity calibration settings into the accelerometer devices, for example, by setting one or more internal fuses, or by any other suitable programming technique.

It is noted that the testers 102 and 401 (see FIGS. 1 and 4) may comprise automatic test equipment (ATE), a general purpose computer, and/or any other suitable apparatus for testing and/or programming sensors and electronic circuits. In addition, the temperature controller 104 may comprise any suitable computer or computerized device. Accordingly, it should be appreciated that the functions necessary to implement the testers 102 and 401 and the temperature controller 104 may be embodied in whole or in part using hardware or software or some combination thereof using micro-controllers, microprocessors, digital signal processors, programmable logic arrays, read only memory (ROM), random access memory (RAM), or any other suitable hardware and/or software.

It will be appreciated by those of ordinary skill in the art that further modifications to and variations of the above-described multi-temperature programming technique for an accelerometer may be made without departing from the inventive concepts disclosed herein. Accordingly, the invention should not be viewed as limited except as by the scope and spirit of the appended claims.

What is claimed is:

1. A method of calibrating at least one sensor having at least one associated output parameter that is temperature dependent, comprising the steps of:
    disposing said at least one sensor on a thermal chuck;
    adjusting a temperature of said thermal chuck to at least one first specified level, thereby setting a temperature of said at least one sensor to approximately the first specified level;
    taking a first measurement of said output parameter associated with said at least one sensor while the temperature of said at least one sensor is set to approximately the first specified level;
    adjusting the temperature of said thermal chuck to at least one second specified level, thereby setting the temperature of said at least one sensor to approximately the second specified level;
    taking a second measurement of said output parameter associated with said at least one sensor while the temperature of said at least one sensor is set to approximately the second specified level;
    calculating a temperature coefficient of said output parameter based upon the first and second measurements of said parameter performed at approximately the first and second temperature levels, respectively;
    determining at least one calibration value based upon the temperature coefficient of said output parameter; and
    employing said at least one calibration value to compensate and calibrate said output parameter associated with said at least one sensor.

2. The method of claim 1 wherein said at least one sensor comprises at least one programmable electronic circuit, and further including the step of programming said at least one programmable electronic circuit within said at least one sensor to maintain at least one calibration setting according to said at least one calibration value, thereby compensating and calibrating said output parameter associated with said at least one sensor.

3. The method of claim 2 further including the step of adjusting the temperature of said thermal chuck to the first specified level before performing said programming step.

4. The method of claim 1 wherein said thermal chuck is disposed within a process chamber, and further including the step of adjusting a temperature of said process chamber to at least one specified level.

5. The method of claim 1 wherein said at least one sensor is disposed on at least one die formed on a semiconductor wafer, and wherein said employing step includes the step of employing said at least one calibration value to perform wafer level compensation and calibration of said output parameter associated with said at least one sensor.

6. The method of claim 5 wherein said step of taking the first measurement of said output parameter associated with said at least one sensor includes the step of taking the first measurement of said output parameter using a wafer prober, and wherein said step of taking the second measurement of said output parameter associated with said at least one sensor includes the step of taking the second measurement of said output parameter using said wafer prober.

7. The method of claim 1 wherein said at least one sensor is incorporated within at least one device disposed on one of a printed circuit board and a pallet, and wherein said employing step includes the step of employing said at least one calibration value to perform one of printed circuit board level and pallet level compensation and calibration of said output parameter associated with said at least one sensor.

8. The method of claim 7 wherein said step of taking the first measurement of said output parameter associated with said at least one sensor includes the step of taking the first measurement of said output parameter using a device prober, and wherein said step of taking the second measurement of said output parameter associated with said at least one sensor includes the step of taking the second measurement of said output parameter using said device prober.

9. The method of claim 1 wherein said at least one sensor comprises at least one integrated convective accelerometer, wherein said output parameter associated with said at least one sensor is an output offset associated with said at least one integrated convective accelerometer, and wherein said calculating step includes the step of calculating at least one offset temperature coefficient (OTC) of said at least one integrated convective accelerometer.

* * * * *